United States Patent [19]

Kaelberer et al.

[11] 4,397,891
[45] Aug. 9, 1983

[54] PROCESS AND APPARATUS FOR INTERNALLY COATING A TUBING

[75] Inventors: Heinz Kaelberer, Walluf; Hans Wolf, Ingelheim, both of Fed. Rep. of Germany

[73] Assignee: Hoechst Aktiengesellschaft, Frankfurt am Main, Fed. Rep. of Germany

[21] Appl. No.: 363,562

[22] Filed: Mar. 30, 1982

[30] Foreign Application Priority Data

Apr. 7, 1981 [DE] Fed. Rep. of Germany ....... 3113959

[51] Int. Cl.³ .......................... B05C 7/04; B05D 7/22
[52] U.S. Cl. ...................................... 427/238; 118/56; 118/105
[58] Field of Search ................... 427/238; 118/56, 105

[56] References Cited

U.S. PATENT DOCUMENTS

| | | |
|---|---|---|
| 2,210,436 | 8/1940 | Weingand et al. |
| 2,901,358 | 8/1959 | Underwood et al. |
| 3,378,379 | 4/1969 | Shiner et al. |
| 3,413,169 | 11/1968 | Krings et al. |
| 3,567,495 | 3/1971 | Gajdos |
| 3,887,713 | 6/1975 | Rasmussen et al. |
| 3,935,320 | 1/1976 | Chiu et al. |
| 4,233,341 | 11/1980 | Hammer et al. |
| 4,287,217 | 9/1981 | Hammer et al. |
| 4,353,939 | 10/1982 | Becker et al. |
| 4,353,940 | 10/1982 | Becker et al. |
| 4,357,371 | 11/1982 | Heinrich et al. |

FOREIGN PATENT DOCUMENTS

| | | |
|---|---|---|
| 1081033 | 7/1980 | Canada. |
| 2505207 | 11/1975 | Fed. Rep. of Germany. |
| 2557994 | 12/1977 | Fed. Rep. of Germany. |
| 2659000 | 11/1978 | Fed. Rep. of Germany. |
| 2801038 | 5/1980 | Fed. Rep. of Germany. |
| 2856253 | 7/1980 | Fed. Rep. of Germany. |
| 2162204 | 8/1980 | Fed. Rep. of Germany. |
| 850504 | 12/1939 | France. |
| 526493 | 9/1940 | United Kingdom. |
| 984026 | 2/1965 | United Kingdom. |
| 1060403 | 3/1967 | United Kingdom. |
| 1201830 | 8/1970 | United Kingdom. |
| 1444442 | 4/1976 | United Kingdom. |
| 1461401 | 1/1977 | United Kingdom. |

Primary Examiner—James R. Hoffman
Attorney, Agent, or Firm—Schwartz, Jeffery, Schwaab, Mack, Blumenthal & Koch

[57] ABSTRACT

A process and apparatus for coating the interior of a fiber-reinforced tube formed of cellulose hydrate in which a tube filled with a coating liquid is passed through a special conveying and pumping device which also serves to replenish the coating liquid. Above the level of the coating liquid, the tube is inflated with a support gas and is gradually flattened. The flattened tube then travels through a metering device made up of wipers in the form of doctor blades or rollers, which retain the major quantity of the coating liquid which is present on the inside surface of the tubing so that a thin, uniform film of the coating liquid is formed. The tubing is thereafter dried to remove the volatile constituents of the coating liquid, and is subsequently wound up.

37 Claims, 3 Drawing Figures

PROCESS AND APPARATUS FOR INTERNALLY COATING A TUBING

BACKGROUND OF THE INVENTION

The present invention relates to a process and apparatus for internally coating a tubing formed of cellulose hydrate, particularly a fiber-reinforced tubing.

German Auslegeschrift No. 28 01 038 discloses a process for coating the inside surface of an endless tubing comprising a plastic film or a closely-woven fabric in which the tubing is filled with a supply of a liquid coating material and is then pulled through a gap formed between a pair of squeeze rollers which are so adjusted that the bulk of the coating material is held back and only a thin film of the coating material adhering to the inside surface of the tubing passes between the squeeze rollers. A number of guide rollers are arranged in series upstream of the pair of squeeze rollers, and the tubing is run around these guide rollers before it is passed between the pair of squeeze rollers which determine the thickness of the internal coating.

This prior art process is comparatively complicated, since the width of the gap between the two squeeze rollers must be very accurately adjusted. Minute, uneven or soiled places on the roller surfaces or variations in the thickness of the tubing material will result in non-uniform coatings.

SUMMARY OF THE INVENTION

Accordingly, it is the object of the present invention to provide an improved process and apparatus for internally coating a tubing.

Another object of the invention is to provide a process and apparatus which are especially adapted for coating a continuous, fiber-reinforced tubing of cellulose hydrate.

A further object of the invention is to provide a process and apparatus which produce an internal coating of uniform thickness on the inside of a tubing.

It is also an object of the present invention to provide a process and apparatus for internally coating a tubing wherein additional coating liquid is continuously conveyed to a supply of coating liquid inside the tubing as the coating liquid is consumed.

An additional object of the invention is to provide a process and apparatus which are comparatively simple to operate.

These and other objects of the invention are achieved by providing a process for internally coating a tubing comprising introducing a supply of a coating liquid into the tubing; inflating the tubing above the level of the coating liquid with a support gas; conveying the tubing vertically upwardly with the tubing carrying a relatively thick layer of coating liquid on its inside surface; flattening the inflated tubing; conveying the flattened tubing along a winding course through a metering device comprising a series of at least two wipers positioned in the direction of travel of the tubing on opposite sides of the tubing in such a way that the two outside surfaces of the flattened tubing are alternately drawn tightly against contact surfaces of successive wipers, said wiper surfaces being rounded in the longitudinal direction of the tubing, whereby the major quantity of the coating liquid carried on the inside surface of the flattened tubing is retained and only a thin layer of the coating liquid remains on the inside surface of the tubing exiting from the metering device; reinflating the tubing upstream of the metering device with support gas; and conveying the reinflated tubing trough a drying station and removing volatile constituents of the coating liquid in said drying station to form a uniform, continuous coating on the inside surface of the tubing; the contact pressure between the tubing and the contact surfaces of the first and last wipers in said metering device being greater than the pressure of the support gas in the tubing upstream and downstream from the metering device whereby support gas is excluded from the tubing in the metering device.

The objects of the invention are also achieved by providing apparatus for internally coating a tubing comprising means for maintaining a supply of coating liquid in said tubing and for maintaining a portion of the tubing above the level of the coating liquid inflated with a support gas; means for flattening the inflated tubing; metering means for retaining the major quantity of the coating liquid carried on the flattened tubing and permitting only a thin layer of coating liquid to remain on the inside surface of the flattened tubing, said metering means comprising a series of at least two wipers having contact surfaces which are rounded in the longitudinal direction of the tubing, said wipers being positioned in the direction of travel of the tubing on opposite sides of the tubing in such a way that the two outside surfaces of the tubing alternately contact the contact surfaces of successive wipers and the tubing traverses a winding course through the metering means; means downstream of said metering means for removing volatile constituents of the coating liquid to form a uniform continuous coating on the inside surface of the tubing; and means for conveying said tubing upwardly from said supply of coating liquid with a relatively thick layer of coating liquid on the inside surface of the tubing, through said flattening means, through said metering means and through said drying means and for maintaining the contact pressure between the tubing and the first wiper of said metering means greater than the pressure of the support gas in the inflated tubing above the supply of coating liquid in order to exclude support gas from the tubing in the metering means.

The term "tubing formed of cellulose hydrate" is to be understood as denoting a tubing produced by coagulation of viscose and comprising a cellulose hydrate gel which has not yet been dried and also a tubing of cellulose hydrate, which has been dried and, if necessary, remoistened so that it has a water content from about 5 to about 15 weight percent. The invention is particularly applicable to fiber-reinforced tubing, i.e. tubing which has a conventional fiber web, such as a paper web, embedded in its wall. In addition, the tubing may contain a known plasticizer, such as glycerol.

The thickness of the tubing may vary within a wide range. Tubings which are used for the production of artificial sausage casings have the usual wall thicknesses from 30 to 300 $\mu$m, especially from 80 to 120 $\mu$m.

The water retention value of the tubing as measured according to DIN 53 814 preferably ranges from about 120 to about 140 weight percent.

The coating liquid is, for example, a polymeric solution or a polymeric dispersion which contains a thermoplastic material in a concentration ranging from 15 to 60 weight percent, particularly from 15 to 30 weight percent. The thermoplastic material may, for example, be a vinylidene chloride copolymer in which the vinylidene chloride proportion exceeds 80 weight percent.

During the period in which the cellulose hydrate tubing is in contact with the dispersion, it absorbs only a small quantity of water therefrom, relative to its water retention value. Preferably, the absorbed quantity of water corresponds to only 20 to 30 percent of the water retention value of the tubing. Consequently, the amount of energy required in the drying device for expelling the water from the film applied to the inside surface of the tubing is substantially lower than in other internal coating processes, in which the proportion of water is very high due to the relatively low concentration of the dispersion. Because of the small quantity of water which must be expelled from the liquid layer on the inside surface of the tubing, it is additionally possible to considerably increase the coating rate in the process of the invention, Since the entire quantity of water contained in the liquid layer must be conveyed to the outside of the tubing by diffusion through the tubing wall, the proportion of water is an important factor in determining the rate at which the coating process can be carried out.

Furthermore, the present process has the advantage that the aqueous polymeric dispersion or solution inside the tubing spreads especially uniformly on the tubing surface due to the flowability of the coating material which results from its viscosity.

Preferably, the tubing is advanced at a rate of 8 to 60 meters/minute; particularly at a rate of 15 to 30 meters/minute.

The weight per unit area of the uninterrupted polymeric layer formed on the inside surface of the tubing is within the usual range, i.e. from about 6 to about 20 grams of polymer per square meter of the substrate surface, particularly from about 8 to about 15 grams per square meter.

In previously used processes, dispersions and solutions having a high polymer concentration have not been used for internally coating cellulose hydrate tubing, since, due to their higher viscosity, it is to be expected that a uniform layer will not be formed and that the thickness of the layer will be too great.

Suitable polymers include copolymers containing vinylidene chloride units, which, after evaporation of the volatile constituents of the coating solution, form a layer on the inside surface of the tubing which is virtually impermeable to water vapor and oxygen. A layer of a known adhesion-promoter which serves to anchor the polymer to the inside wall of the tubing may be applied to the inside surface of the tubing before the process is started. Suitable adhesion promoters include water-insoluble reaction products formed by heat curing of epichlorohydrin and a polyaminoamide.

The lower portion of the tubing, which is filled with coating liquid, preferably has the shape of a loop. This loop is made up of a downwardly extending tubing portion, followed by a tubing portion which is, for example, deflected by a guide roller, and another tubing portion which extends upwardly. The downwardly extending tubing portion may be oriented in a vertical or in an oblique direction.

In the area above the level of the coating liquid, the inside surface of the tubing carries a relatively thick layer of the coating liquid and is filled with a support gas, particularly with air. The pressure exerted by the support gas ensures that the tubing has a circular or substantially circular cross-section. Optionally, the support gas may cause a slight radial expansion of the tubing. In this area, the tubing is increasingly flattened and thus gradually converted from the inflated state in which it has a circular cross-section, to a flattened state, under conditions which prevent the formation of folds. This is done with the aid of devices which are conventionally used for crease-free flattening of extruded plastic tubes during the manufacture thereof. Such devices include, for example, guide plates, guide rollers, roller tracks or conveyor belts.

In the flattened state, the tubing is then passed through a metering device which is so adjusted that the major quantity of the coating liquid present on the inside wall of the flattened tubing is held back, and an uninterrupted, continuous film of coating liquid having only a small thickness is formed on the inside wall of the tubing issuing from the metering device.

The metering device comprises at least two wipers in the form of doctor blades or rollers which are arranged one above the other in the direction of travel of the tubing and which are alternately in close contact with the two outside surfaces of the flattened tubing. The flattened tubing is guided in a winding course past the wipers, preferably in frictional contact therewith, with its two outside surfaces alternately brushing past adjacent wipers. The surfaces of the wipers, which are contacted and partially encircled by the tubing, are curved in the vertical direction, whereby the smaller the angle at which the tubing is run around a wiper, the smaller the radius of curvature of the wiper surface will be.

The contact pressure between the tubing and the wipers must be sufficiently high that the support gas, which is present in the tubing upstream and downstream of the metering device, cannot enter into the flattened tubing portion traveling through the metering device. Depending on the rate of travel of the tubing and the concentration of the coating liquid in the tubing, the continuous passage of the tubing through the metering device produces an acccumulation of coating liquid immediately upstream of the first wiper. When the tubing issues from the metering device, it carries a thinner coating layer than prior to entering the metering device. The correct adjustment of the rate of travel and of the concentration of the coating liquid to obtain a specific weight per unit area of the resulting film coating on the inside surface of the tubing can, for each particular case, be determined by a few simple preliminary tests.

Preferably, at least one of the wipers, especially the first and/or the last in the array of wipers, is in the form of a roller which is advantageously rotatably constructed. The roller or rollers may be drivable and may have a smooth or a profiled surface.

The tubing is run around the rollers and/or doctor blades in a winding or zig-zag course, whereby it partially encircles the respective roller or blade circumference.

The wipers are dimensionally stable and are made from a material such as metal or plastic which renders them sufficiently stable in shape.

Downstream of the metering device, the flattened tubing is again converted to the state in which it is filled with a support gas. This may be accomplished with the aid of a device comprising conventional guide plates, guide rollers, roller tracks or conveyor belts. Devices of this kind are known and are used in the manufacture of extruded plastic tubes.

The tubing, which continues to move vertically upwards, is then freed from the volatile constituents of the coating liquid, whereby a uniform, uninterrupted film coating is formed on its inside surface. This may be achieved, for example, by passing the tubing through a conventional drying tunnel.

After cooling, which may be effected by means of a cold-air fan, the tubing optionally may be re-moistened to a water content of from about 5 to about 20 weight percent. The optional re-moistening may suitably be achieved by spraying the tubing with water.

Further downstream, a mechanism is provided which serves to pull the tubing through the preceding metering, drying and optional moistening devices and which preferably flattens the tubing. This mechanism may appropriately comprise a pair of squeeze rollers. Since the coating is finished and dried prior to entering the drive roller pair, the drive rollers do not affect the thickness of the internal coating.

The internally coated tubing produced by the process of the invention is usually wound onto a roll for storage or transport.

In one preferred embodiment, the coating liquid which is present in the lower portion of the tubing is prevented from flowing back in a direction counter to the forward travel of the tubing. For this purpose, the lower portion of the tubing, which is filled with coating liquid, is compressed and flattened over a short distance, while preferably simultaneously conveying the tubing in the direction of the metering device. Backflow of the coating liquid may, for example, be caused by the pressure of the support gas above the level of the coating liquid. Therefore, a pair of rotatably constructed squeeze rollers may be used to compress and flatten the liquid-filled tubing, transporting the tubing forward and thus simultaneously preventing any backflow of the coating liquid. The pair of squeeze rollers is preferably arranged in the downwardly running tubing portion, upstream of the U-turn in the tubing, provided that the lower tubing portion, which is filled with coating liquid, has the form of a loop.

In a particularly advantageous embodiment of the process, the supply of coating liquid is replenished at a rate corresponding to the rate at which it is consumed by coating the inside wall of the tubing; the rate of consumption being dependent on the rate of travel of the tubing and on the concentration of the coating liquid, whereby the level of the coating liquid is adjusted and held at a specific height. In such a case, the rate at which the coating liquid is conveyed in the direction of travel of the tubing is considerably lower than the rate of travel of the tubing.

For simultaneously replenishing the coating liquid and maintaining the height of the liquid level constant, devices such as those described in German Pat. Nos. 25 57 994 and 26 59 000 or in German Offenlegungsschrift No. 28 56 253, are used.

The device according to German Pat. No. 25 57 994 comprises two roll spiders to which a number of rotatable rollers are attached. Each roll spider, on the one hand, rotates about its center and, on the other hand, performs an oscillating movement in the direction of the tubing surface.

The device disclosed in German Pat. No. 26 59 000 has two conveyor-type endless belts, both of which are provided with sinusoidal protrusions on their outer surfaces. These endless belts transport the tubing which is compressed between them, while the coating liquid contained in the hollow spaces formed by the protrusions is conveyed in the direction of movement of the tubing.

German Offenlegungsschrift No. 28 56 253 describes a device for simultaneously transporting a tubing in the direction of its longitudinal axis and conveying an enclosed coating liquid. This device comprises two conveyor units which are positioned opposite each other and which contact the tubing in the direction of its longitudinal axis. The first conveyor unit is a rotating endless conveyor belt, while the second conveyor unit has the form of a rotating cylindrical roller. Both units have sinusoidal protrusions on their contact surfaces with the tubing. The tubing is urged over its entire width against the endless conveyor belt by these protrusions at spaced intervals and is thereby squeezed or compressed at intervals corresponding to the distances between adjacent protrusions. The conveyors are driven at the same speed in the direction of travel of the tubing so that the tubing is advanced by the conveyor units contacting its outside surface, and the partial quantities of liquid which are present in the tubing sections between neighboring compressed zones are conveyed in the direction of travel of the tubing.

The two conveyor units are so arranged with respect to each other that the minimum distance between their surfaces corresponds to twice the wall thickness of the transported tubing and, as a result, the tubing is tightly compressed in these zones.

Advantageously, the endless conveyor belt is flexible and is made of a material which provides both sufficient flexibility and adequate dimensional stability. A suitable material is, for example, rubber. The second, cylindrical conveyor unit, on the other hand, preferably is non-deformable and appropriately is made of metal or plastic.

The conveying and pumping device is preferably arranged in the lower part of the tubing, in such a way that the tubing is deflected to form a loop, the device being simultaneously used to at least partially change the direction of the tubing.

The preferred endless conveyor belt of the present invention is modified in comparision to the device described in German Offenlegungsschrift No. 28 56 253 in that it has a planar surface. For an exact metering of the coating liquid, a rotating metering roller is preferably mounted between the guide rollers of the conveyor belt. By adjusting the length of stroke of the metering roller which is urged towards the second, cylindrical conveyor unit, the conveyed quantity of coating liquid is determined and is infinitely variable within a given range. It is, for example, possible to adjust the length of stroke of the metering roller by means of a stop, in the direction of which the mounting support of the metering roller is displaceable. The height of the protrusions on the circumferential surface of the cylindrical roller advantageously may lie between 2 and 10 mm, preferably between 6 and 10 mm, when the diameter of the cylindrical roller ranges from about 250 to about 500 mm.

One of the two guide rollers of the conveyor belt is optionally arranged to be movable in the direction of travel of the conveyor belt. When a protrusion of the cylindrical conveyor unit is pressed into the conveyor belt, this movable guide roller is drawn toward the other guide roller. A reset mechanism, such as a spring, returns the movable guide roller to its initial position. In this arrangment, the second guide roller is driven and is in frictional contact and/or connection with the conveyor belt in their area of contact. The two guide rollers and the second, cylindrical conveyor unit are mounted on shafts and are rotatable about their centers.

This preferred embodiment of the conveying and pumping device which comprises an endless conveyor belt with a planar surface, has several advantages over the devices which are disclosed in the three above-mentioned publications. It is relatively easy to construct the endless conveyor belt. The mechanical stress exerted on the tubing by the contact of the two conveyor units is considerably reduced. The conveyed quantity of coating liquid can be exactly adusted, since there is no risk that the protrusions on the circumferential surfaces of the two conveyor units will be displaced with respect to each other during the operation of the device.

BRIEF DESCRIPTION OF THE DRAWINGS

The invention is explained in further detail with reference to the accompanying drawings wherein.

DETAILED DESCRIPTION OF A PREFERRED EMBODIMENT

Figure 1:
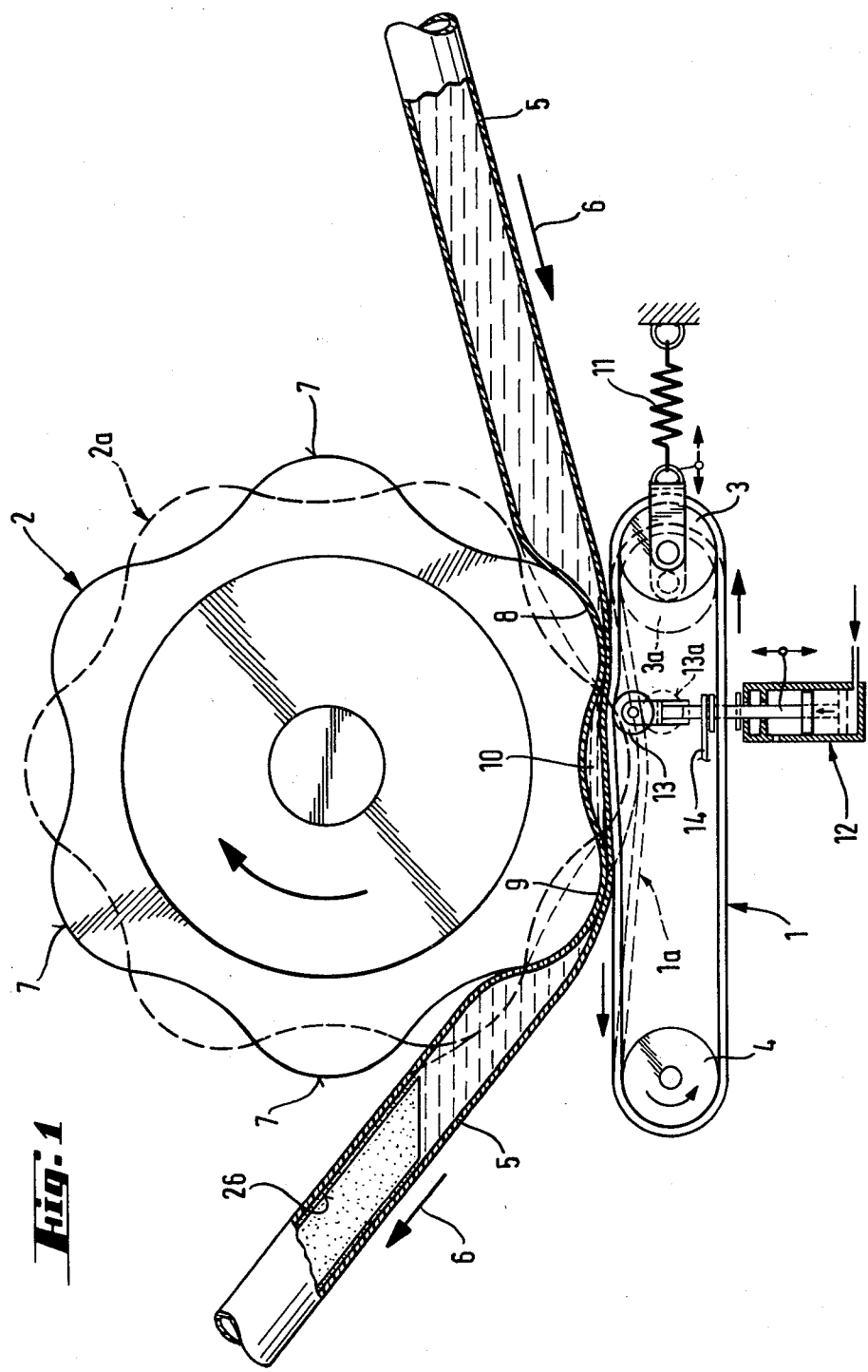
FIG. 1 shows an advantageous embodiment of the conveying and pumping device.

The conveying and pumping device shown in FIG. 1 comprises the oppositely arranged conveyor units 1 and 2. The first conveyor unit is an endless belt 1 which is made of an elastic material and has a substantially planar surface. It is run over two guie rollers 3 and 4 which are arranged in spaced relationship with respect to each other. The second conveyor unit is a cylindrical roller 2 which is provided with a profile extending transversely to the direction of travel of the tubing (see arrows 6), on its surface which is in contact with the tubing 5. The protrusions 7 of the profile press the tubing 5 at spaced intervals against the planar surface of the endless belt 1, so that the portion of the tube between two neighboring compressed zones 8 and 9 is filled with a quantity of coating liquid 10. In the illustrated embodiment, the coating liquid may suitably be an aqueous dispersion of a vinylidene chloride copolymer containing 25 weight percent of the copolymer; said dispersion being capable of forming a layer which is impermeable to water vapor. Tubing 5 represents a fiber-reinforced cellulose hydrate tubing.

The guide roller 3 is mounted to be movable in the direction of travel 6. When the two conveyor units are pressed together, this guide roller 3 is displaced in the direction of travel 6 and when the conveyor units separate, is cyclically returned to its initial position by means of a spring 11.

The metering element 12 comprises a rotating metering roller 13 which serves to effect fine adjustment of the quantity of liqid 10 enclosed between adjacent compressed zones. For this purpose, the metering roller 13 is pressed against the belt 1, its length of stroke being limited and adjusted with the aid of a stop 14, illustrated in diagrammatic form in FIG. 1.

The broken line illustrations of conveyor units 1a and 2a, guide roller 3a and metering roller 13a in FIG. 1 show the positions of these elements, time-shifted from the solid line illustrations of the positions of these elements indicated by reference numerals 1, 2, 3 and 13 in FIG. 1. For reasons of clarity, driving means and supports for the conveyor units 1 and 2 have been omitted from the drawing.

Figure 2:
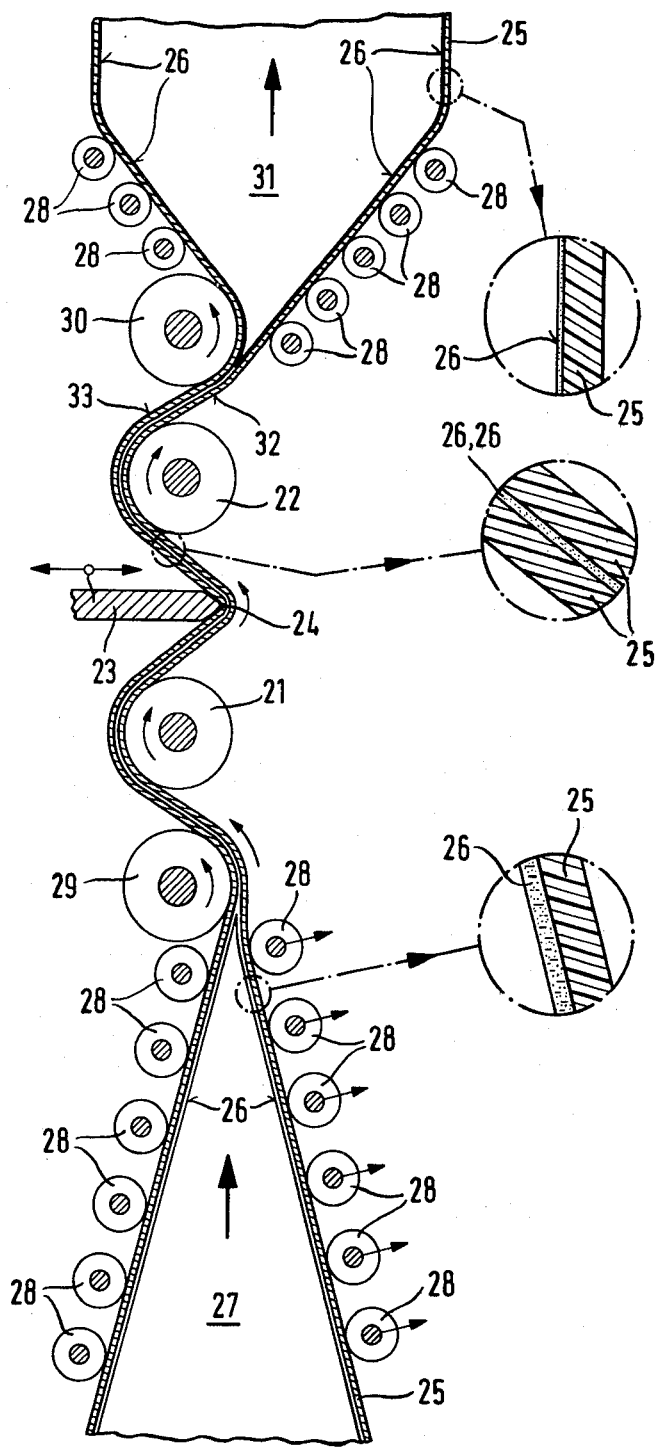
FIG. 2 depicts a preferred embodiment of the metering device.

The metering device depicted in FIG. 2 includes two wipers in the form of rollers 21 and 22 and a wiper in the form of a doctor blade 23. Rollers 21 and 22 may have planar or grooved surfaces. Doctor blade 23 has a rounded contact surface 24. These wipers are arranged in the direction of travel of the tubing. The tubing portion 25 carries a relatively thick layer of the coating liquid 26 on its inside surface and forms a cavity 27 which is filled with a support gas. Upstream of the metering device, the tubing is gradually converted from an inflated to a flattened state under conditions which prevent the formation of folds by roller-type, rotating guiding elements 28 which are disposed in two rows. A similar arrangement of roller-type guiding elements 28 is provided downstream of the metering device for gradually re-establishing the inflated state of the tubing by introducing support gas in its cavity 31. The tubing is held tightly against the first wiper roller 29 and the last wiper roller 30 of the metering device so that the support gas which is under pressure cannot penetrate into the metering device from the cavities 27 and 31. The tubing travels through the metering device along a winding or zig-zag course with its two flattened surfaces 32 and 33 alternately closely contacting wipers 21, 22, 23, 29 and 30.

Figure 3:
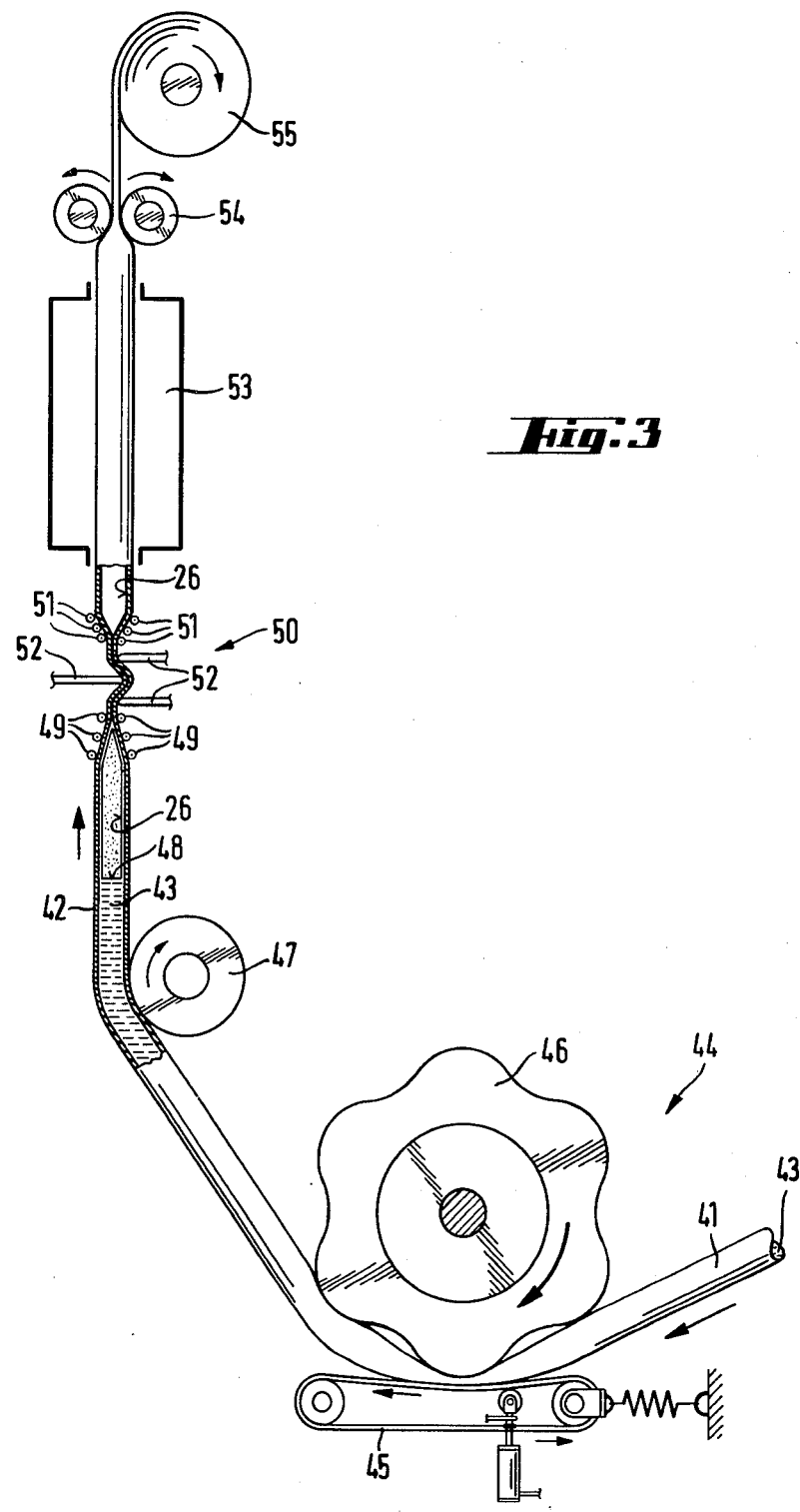
FIG. 3 illustrates the sequence of operations in the internal coating procedure.

The arrangement illustrated in FIG. 3 shows tubing portions 41 and 42 which extend obliquely downwardly and upwardly and are filled with coating liquid 43. A conveying and pumping device 44 is provided comprising two conveyor units 45 and 46. It transports the tubing, for example, at a rate of 15 to 30 meters/minute and is also used to resupply coating liquid from the tubing portion 41 to the tubing portion 42, while maintaining a constant height of the liquid lever 48. The conveying and pumping device also acts as a deflecting or turning element for the tubing. For the further partial deflection of the tubing portion 42, a roller 47 is provided. Above the level 48 of the coating liquid 43, the tubing is inflated with support gas and is gradually flattened by guide rollers 49, before it enters metering device 50. Downstream of the metering device, the tubing is again converted to the inflated state by means of guide rollers 51. Metering device 50 comprises a series of wipers in the form of doctor blades 52, which are only diagrammatically shown. The internally coated tubing is passed through a drying device 53 and is then flattened by a pair of squeeze rollers 54 and wound up by means of a roller 55. The pair of squeeze rollers 54 is also used to pull the tubing through the metering device 50.

In the described procedure, the tension exerted on the tubing must be kept constant to obtain a uniform coating. The coating thickness decreases with increasing tension. For example, a tension of from 130 to 180 Newtons is required for coating a fiber-reinforced cellulose hydrate tubing with a vinylidene chloride copolymer, as mentioned in the description of FIG. 1, to give a weight per unit area of the coating of 7 to 12 grams per square meter. The proper tension can be determined in any given case by simple preliminary tests.

The foregoing description has been set forth merely to illustrate the invention and is not intended to be limiting. Since modifications of the described embodiments incorporating the spirit and substance of the invention may occur to persons skilled in the art, the scope of the invention is to be limited solely with respect to the appended claims and equivalents.

We claim:

1. A process for internally coating a tubing comprising the steps of:
   introducing a supply of a coating liquid into the tubing;
   inflating the tubing above the level of the coating liquid with a support gas;
   conveying the tubing vertically upwardly with the tubing carrying a relatively thick layer of coating liquid on its inside surface;
   flattening the inflated tubing;
   conveying the flattened tubing along a winding course through a metering device comprising a series of at least two wipers positioned in the direction of travel of the tubing on opposite sides of the tubing in such a way that the two outside surfaces of the flattened tubing are alternately drawn tightly against contact surfaces of successive wipers, said wiper surfaces being rounded in the longitudinal direction of the tubing, whereby the major quantity of the coating liquid carried on the inside surface of the flattened tubing is retained and only a thin layer of the coating liquid remains on the inside surface of the tubing exiting from the metering device;
   reinflating the tubing upstream of the metering device with support gas; and
   conveying the reinflated tubing through a drying station and removing volatile constituents of the coating liquid in said drying station to form a uniform, continuous coating on the inside surface of the tubing;
   the contact pressure between the tubing and the contact surfaces of the first and last wipers in said metering device being greater than the pressure of the support gas in the tubing upstream and downstream from the metering device whereby support gas is excluded from the tubing in the metering device.

2. A process according to claim 1, wherein said tubing is formed of cellulose hydrate.

3. A process according to claim 2, wherein said cellulose hydrate tubing is fiber-reinforced.

4. A process according to claim 1, wherein said tubing is conveyed at a constant speed.

5. A process according to claim 1, wherein the volatile constituents of the coating liquid are removed in said drying station by heating.

6. A process according to claim 1, further comprising after the drying step, the additional step of re-moistening the tubing with water to a water content of from about 5 to about 20 weight percent.

7. A process according to claim 1, wherein said metering device comprises at least three wipers.

8. A process according to claim 1, wherein at least one of said wipers in said metering device is a roller.

9. A process according to claim 8, wherein said roller is rotatable.

10. A process according to claim 8, wherein at least the first and last wipers in said series are rotatable rollers.

11. A process according to claim 1, wherein at least one wiper in said metering device is a doctor blade.

12. A process according to claim 1, wherein said tubing is first conveyed downwardly and then is turned and conveyed upwardly along a U-shaped path and said supply of coating liquid is located at the bottom of said U-shaped path.

13. A process according to claim 1, wherein said supply of coating liquid is constantly replenished as it is used.

14. A process according to claim 1, wherein backflow of said supply of coating liquid within said tubing is prevented by temporarily compressing said tubing at spaced intervals while simultaneously conveying said tubing in the direction of said metering device.

15. A process according to claim 14, wherein additional coating liquid is introduced into said supply of coating liquid by temporarily compressing the tubing at spaced intervals with coating liquid trapped in cavities between successive compressed areas of the tubing and simultaneously conveying the tubing in the direction of the supply of coating liquid.

16. A process according to claim 15, wherein the rate at which additional coating liquid is conveyed to said supply of coating liquid is equal to the rate at which coating liquid is permitted to pass through the metering device.

17. A process according to claim 15, wherein the volume of the cavities between successive compressed areas of the tubing is adjusted to vary the rate at which additional coating liquid is conveyed to said supply of coating liquid.

18. Apparatus for internally coating a tubing comprising:
   means for maintaining a supply of coating liquid in said tubing and for maintaining a portion of the tubing above the level of the coating liquid inflated with a support gas;
   means for flattening the inflated tubing;
   metering means for retaining the major quantity of the coating liquid carried on the flattened tubing and permitting only a thin layer of coating liquid to remain on the inside surface of the flattened tubing, said metering means comprising a series of at least two wipers having contact surfaces which are rounded in the longitudinal direction of the tubing, said wipers being positioned in the direction of travel of the tubing on opposite sides of the tubing in such a way that the two outside surfaces of the tubing alternately contact the contact surfaces of successive wipers and the tubing traverses a winding course through the metering means;
   means downstream of said metering means for removing volatile constituents of the coating liquid to form a uniform continuous coating on the inside surface of the tubing; and
   means for conveying said tubing upwardly from said supply of coating liquid with a relatively thick layer of coating liquid on the inside surface of the tubing, through said flattening means, said metering means and said drying means and for maintaining the contact pressure between the tubing and the first wiper of said metering means greater than the pressure of the support gas in the tubing above said supply of coating liquid in order to exclude support gas from the tubing in the metering means.

19. Apparatus according to claim 18, wherein said flattening means comprises means for gradually flattening the tubing without forming folds.

20. Apparatus according to claim 18, wherein said flattening means comprises a series of pairs of rollers between which the inflated tube is passed; the rollers of each successive pair being positioned progressively closer to each other.

21. Apparatus according to claim 18, wherein said drying means comprises a heating chamber.

22. Apparatus according to claim 18, further comprising sprayer means downstream of said drying means for re-moistening the tubing with water after drying.

23. Apparatus according to claim 18, wherein said tubing conveying means comprises a pair of squeeze rollers downstream of said drying means between which said tubing is passed.

24. Apparatus according to claim 18, further comprising means downstream of said metering means for reinflating said tubing with support gas.

25. Apparatus according to claim 18, further comprising means upstream of said supply of coating liquid for transporting said tubing in a longitudinal direction, said transporting means comprising a pair of drivable conveyor units disposed opposite each other with the tubing passing between them, said conveyor units moving at the same speed in the direction of travel of the tubing and temporarily compressing the tubing over its entire width between them at spaced intervals.

26. Apparatus according to claim 25, wherein at least one of said conveyors is a rotatable element with a profiled surface which compresses said tubing at at least two longitudinally spaced locations and traps additional coating liquid in a cavity formed between successive compressed areas of the tubing whereby the tubing and a measured amount of additional coating liquid are simultaneously conveyed in the direction of said supply of coating liquid.

27. Apparatus according to claim 26, further comprising means for adjusting the size of cavity formed between adjacent compressed areas of the tubing in order to vary the quantity of additional coating liquid conveyed to the supply of coating liquid.

28. Apparatus according to claim 27, wherein said adjusting means comprises a rotatable metering roller engaging the inside surface of said conveyor belt, said metering roller being radially displaceable in a direction transverse to the direction of motion of said conveyor belt toward said second conveyor unit.

29. Apparatus according to claim 28, further comprising stop means for limiting the range of motion of said metering roller.

30. Apparatus according to claim 25, wherein one of said conveyor units comprises an endless conveyor belt running around at least two spaced guide rollers and the other of said conveyor units is a roller having a profiled surface extending transversely to the direction of travel of the tubing.

31. Apparatus according to claim 30, wherein at least one of said guide rollers is movable in the direction of travel of the tubing in response to engagement of said endless conveyor belt by the profiled surface of said second conveyor unit, and spring means are provided for returning said guide roller to its original position.

32. Apparatus according to claim 30, wherein said conveyor belt has a substantially flat surface.

33. Apparatus according to claim 18, wherein said metering means comprises a series of at least three wipers.

34. Apparatus according to claim 18, wherein at least one of said wipers is a roller.

35. Apparatus according to claim 34, wherein said roller is rotatable.

36. Apparatus according to claim 18, wherein the first and last wipers in said series are rotatable rollers.

37. Apparatus according to claim 18, wherein at least one of said wipers is a doctor blade.

* * * * *